United States Patent
Berg

Patent Number: 6,152,587
Date of Patent: Nov. 28, 2000

[54] SIDEVIEW MIRROR WITH AUXILIARY LIGHTS

[76] Inventor: Jerome I. Berg, 11410 NE. 124th #274, Kirkland, Wash. 98034

[21] Appl. No.: 09/244,386

[22] Filed: Feb. 4, 1999

[51] Int. Cl.[7] ..................................................... B60Q 1/26
[52] U.S. Cl. ........................... 362/494; 362/540; 340/468
[58] Field of Search .................................... 362/494, 540, 362/541; 340/468

[56] References Cited

U.S. PATENT DOCUMENTS

| | | | |
|---|---|---|---|
| 5,499,169 | 3/1996 | Chen | 362/494 |
| 5,669,705 | 9/1997 | Pastrick et al. | 362/494 |
| 5,805,366 | 9/1998 | McFarland | 362/494 |

*Primary Examiner*—Stephen Husar

[57] ABSTRACT

A side view mirror with auxiliary lights for providing additional signaling to other drivers so they are aware of vehicle operations. The invention device includes a housing securable to a side of a vehicle. The housing has a mirror disposed within a rear face thereof. Within the housing, in appropriate locations, are various lights serving the specific functions of running light, side light, turn indicator, brake light, hazard indicator and turning light, with spot light, reverse light and light indicator system, that combine to provide exterior auxiliary lighting for the multiple functions of the vehicle from an optional location.

17 Claims, 2 Drawing Sheets

SIDEVIEW MIRROR WITH AUXILIARY LIGHTS

BACKGROUND OF THE INVENTION

1. Field of the Invention

The present invention relates to side view mirrors and more particularly pertains to a new side view mirror with auxiliary lights for providing additional signaling to other drivers so they are aware of vehicle operations, and for providing the driver with additional lighting options.

2. Description of the Prior Art

The use of side view mirrors is known in the prior art. More specifically, side view mirrors heretofore devised and utilized are known to consist basically of familiar, expected and obvious structural configurations, notwithstanding the myriad of designs encompassed by the crowded prior art which have been developed for the fulfillment of countless objectives and requirements.

Known prior art side view mirrors include U.S. Pat. No. 5,303,130 to Wei et al.; U.S. Pat. No. 4,583,155 to Hart; U.S. Pat. No. 4,475,100 to Duh; U.S. Pat. No. 5,109,214 to Heidman, Jr.; U.S. Pat. No. 4,890,907 to Vu et al.; and U.S. Pat. No. Des. 300,312 to Skogler et al.

While these devices fulfill their respective, particular objectives and requirements, the aforementioned patents do not disclose a new side view mirror with auxiliary lights. The inventive device includes a housing securable to a side of a vehicle. The housing has a mirror disposed within a rear face thereof. A running light is disposed within the housing and is in communication with a headlight system of the vehicle. A turning light is also disposed within the housing and is in communication with a turn indicator of the vehicle.

In these respects, the side view mirror with auxiliary lights according to the present invention substantially departs from the conventional concepts and designs of the prior art, and in so doing provides an apparatus primarily developed for the purpose of providing additional signaling to other drivers so they are aware of vehicle operations.

SUMMARY OF THE INVENTION

In view of the foregoing disadvantages inherent in the known types of side view mirrors now present in the prior art, the present invention provides a new side view mirror with auxiliary lights construction wherein the same can be utilized for providing additional signaling to other drivers so they are aware of vehicle operations, as well as providing the driver with additional lighting options.

The general purpose of the present invention, which will be described subsequently in greater detail, is to provide a new side view mirror with auxiliary lights apparatus and method which has many of the advantages of the side view mirrors mentioned heretofore and many novel features that result in a new side view mirror with auxiliary lights which is not anticipated, rendered obvious, suggested, or even implied by any of the prior art side view mirrors, either alone or in any combination thereof.

To attain this, the present invention generally comprises a housing securable to a side a vehicle. The housing has a mirror disposed within a rear face thereof. A spot light is disposed within an upper portion of an outer edge of the housing. The spot light has a control mechanism positioned interiorly of the vehicle. A running light is disposed within an upper portion of a front edge of the housing. A side light is disposed within a lower portion of the outer edge of the housing. The side light is in communication with a turn indicator and a hazard indicator of the vehicle. A brake light is disposed within a lower portion of a rear edge of the housing. The brake light is in communication with a brake actuator and a hazard indicator of the vehicle. A turning light is disposed within a lower portion of the front edge of the housing. The turning light is in communication with the turn indicator of the vehicle. A light indicator system is disposed within the rear face of the housing. The light indicator system is in communication with an electrical system of the vehicle. A reverse light is disposed within a lower portion of an inner edge of the housing. The reverse light is in communication with a reverse light actuator of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new side view mirror with auxiliary lights apparatus and method which has many of the advantages of the side view mirrors mentioned heretofore and many novel features that result in a new side view mirror with auxiliary lights which is not anticipated, rendered obvious, suggested, or even implied by any of the prior art side view mirrors, either alone or in any combination thereof.

It is another object of the present invention to provide a new side view mirror with auxiliary lights which may be easily and efficiently manufactured and marketed.

It is a further object of the present invention to provide a new side view mirror with auxiliary lights which is of a durable and reliable construction.

An even further object of the present invention is to provide a new side view mirror with auxiliary lights which is susceptible of a low cost of manufacture with regard to both materials and labor, and which accordingly is then susceptible of low prices of sale to the consuming public, thereby making such side view mirror with auxiliary lights economically available to the buying public.

Still yet another object of the present invention is to provide a new side view mirror with auxiliary lights which provides in the apparatuses and methods of the prior art some of the advantages thereof, while simultaneously overcoming some of the disadvantages normally associated therewith.

Still another object of the present invention is to provide a new side view mirror with auxiliary lights for providing additional signaling to other drivers so they are aware of vehicle operations.

Yet another object of the present invention is to provide a new side view mirror with auxiliary lights with a housing securable to a side of a vehicle. The housing has a mirror disposed within a rear face thereof. A running light is disposed within the housing and is in communication with a headlight system of the vehicle. A turning light is also disposed within the housing and is in communication with a turn indicator of the vehicle.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
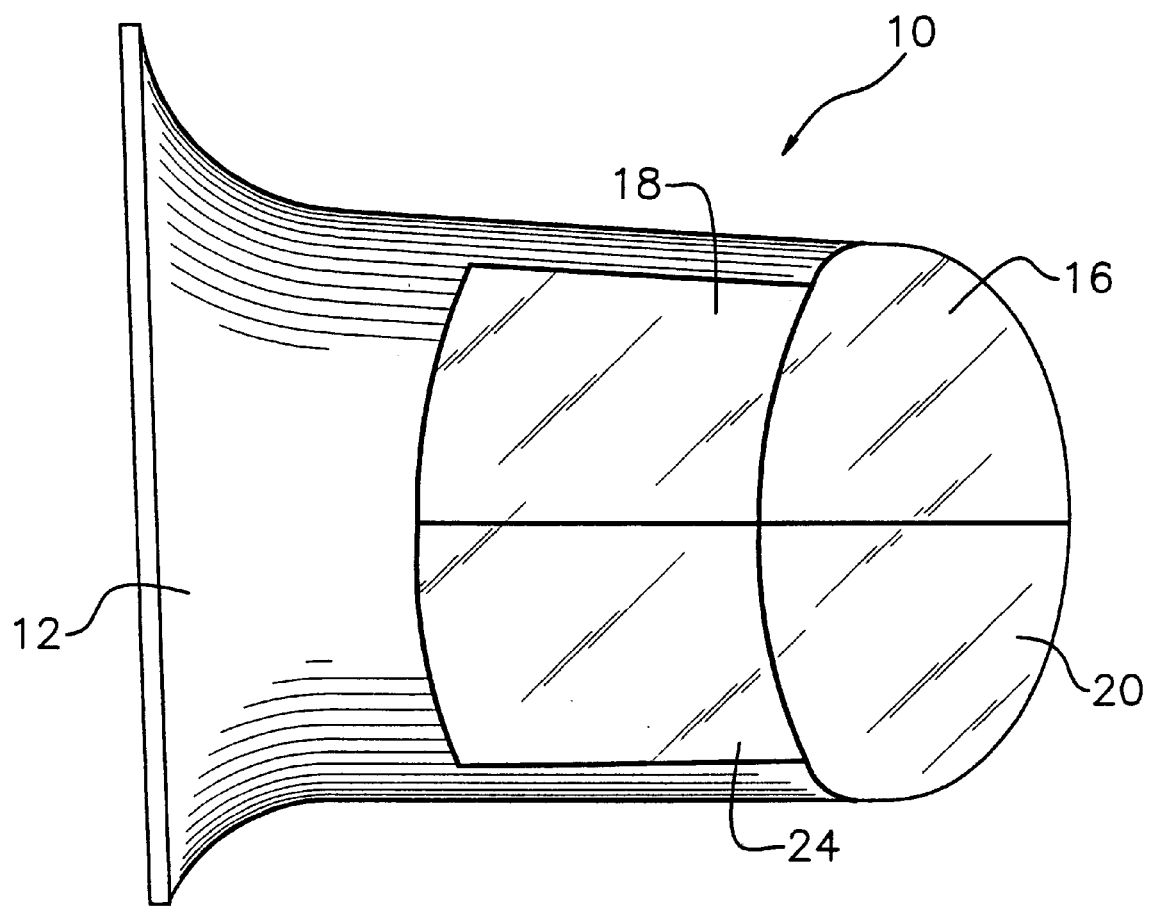
FIG. 1 is a front view of a new side view mirror with auxiliary lights according to the present invention.
Figure 2:
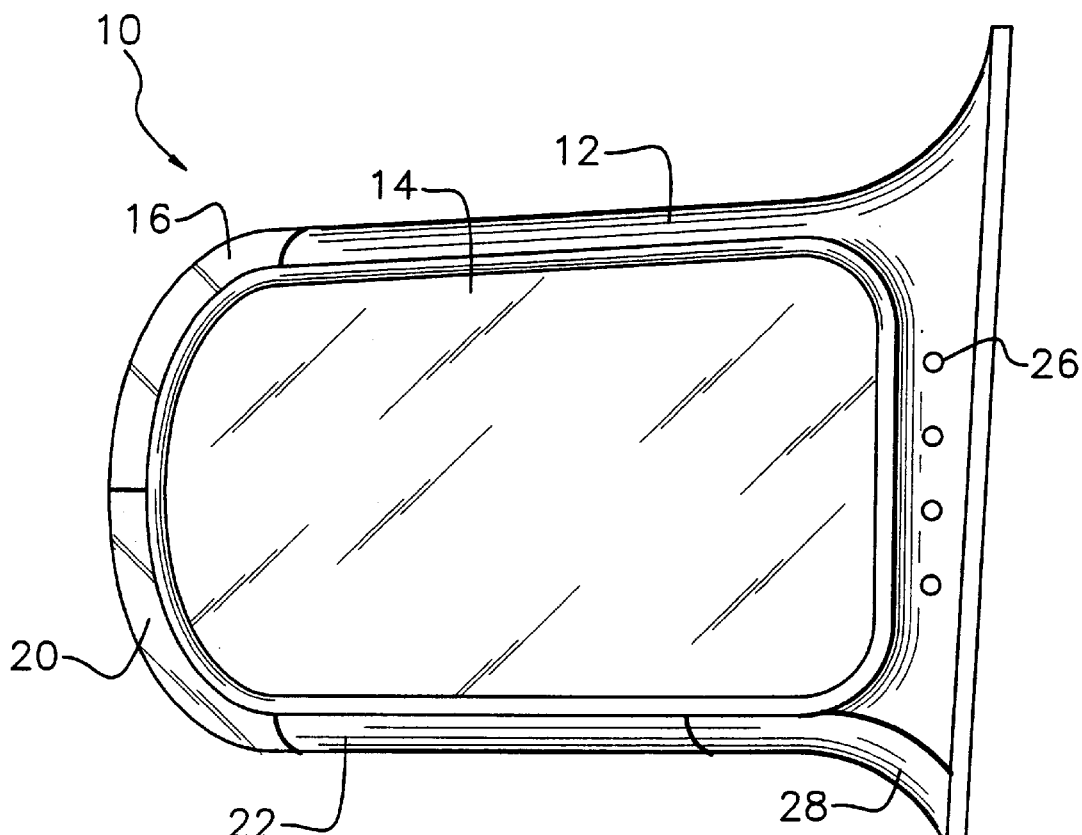
FIG. 2 is a rear view of the present invention.
Figure 3:
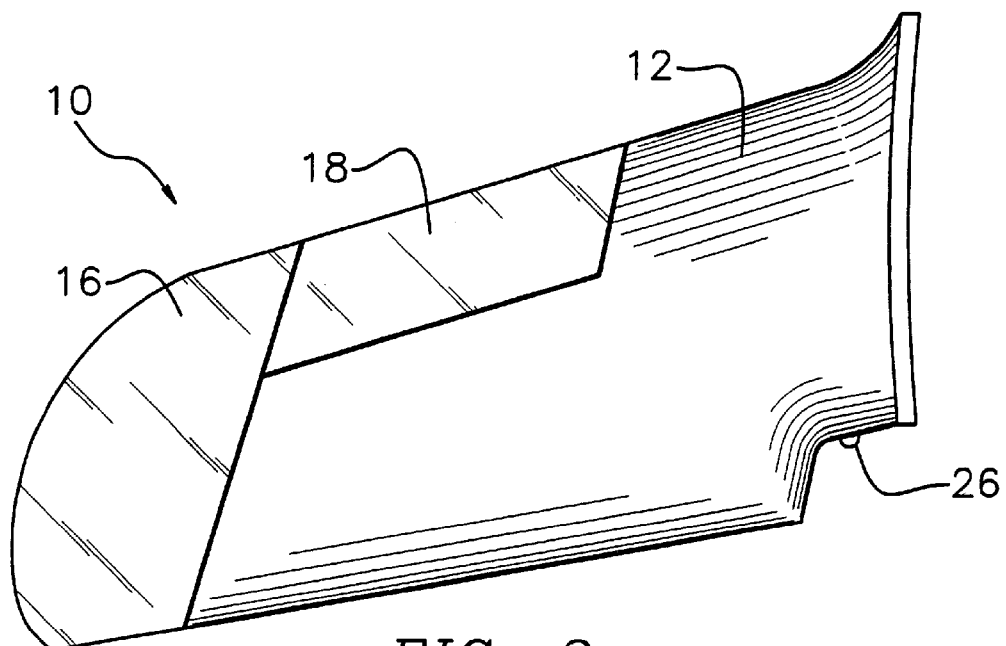
FIG. 3 is a top plan view of the present invention.

With reference now to the drawings, and in particular to FIGS. 1 through 3 thereof, a new side view mirror with auxiliary lights embodying the principles and concepts of the present invention and generally designated by the reference numeral 10 will be described.

As best illustrated in FIGS. 1 through 3, the side view mirror with auxiliary lights 10 comprises a housing 12 securable to a side of a vehicle (not shown) such as, for example, an automobile, snowmobile, truck, recreational vehicle, motorcycle, or watercraft. The housing 12 has a mirror 14 disposed within a rear face thereof.

A running light 18 is disposed within the housing 12 and is in communication with a headlight system of the vehicle. Preferably, the running light 18 is disposed within an upper portion of a front edge of the housing 12. The running light 18 comes on with the headlights and the parking lights of the vehicle, thereby making the side of the vehicle more visible. Ideally the running light is clear.

A turning light 24 is disposed within the housing 12 and is in communication with the turn indicator of the vehicle. Preferably the turning light 24 is disposed within a lower portion of the front edge of the housing 12. The turning light 24 illuminates the nearby roadway that is not covered by the normal headlights when making turns, particularly useful when turning into poorly illuminated streets and driveways. Ideally, the turning light is clear.

Preferably, a side light 20 is disposed within the housing 12 and is in communication with a turn indicator and a hazard indicator of the vehicle. More preferably, the side light 20 is disposed within a lower portion of the outer edge of the housing 12. The side light indicates to other drivers, particularly those in the lane next to the vehicle where it may be difficult to see the turning signal lights that are usually adjacent the front and rear bumpers, that the driver wishes to turn or change lanes. The driver is also much less likely to drive with his side lights on because he will have a much greater chance of seeing the side light 20 on the housing 12 flashing. The side light would also come on when the hazard indicator is activated to provide additional visual warning. Ideally, the side light emits amber light.

Also preferably, a brake light 22 is disposed within the housing 12 and is in communication with a brake actuator of the vehicle. More preferably, the brake light 22 is disposed within a lower portion of a rear edge of the housing 12. The brake light 22 may also be in communication with a hazard indicator of the vehicle. Preferably, the hazard indicator is in communication with the side light 20 and the brake light 22 such that activation of the side light 20 alternates with the activation of the brake light 22. Ideally, the brake light emits red light.

Preferably, a reverse light 28 is disposed within the housing and is in communication with a reverse light actuator of the vehicle to illuminate the total area along each side of the vehicle while in reverse. More preferably, the reverse light 28 is disposed within a lower portion of the housing, ideally adjacent the brake light 22. The reverse light 28 may also be activated separately for additional lighting. The reverse light may also come on when the hazard indicator is activated to provide additional lighting. Ideally, the reverse light is clear.

Preferably, a spot light 16 is disposed within the housing 12. More preferably, the spot light 16 is disposed within an upper portion of an outer edge of the housing 12. Ideally, the spot light 16 has a control mechanism positioned interiorly of the vehicle. The spot light 16 can be manipulated from within the vehicle to shine on objects that cannot be readily seen. The spot light 16 is particularly useful for locating street signs, home numbers, lost pets, and the like. Ideally, the spot light is clear.

Preferably, a light indicator system 26 is disposed within the housing 12 and is in communication with an electrical system of the vehicle. More preferably, the light indicator system 26 is disposed within the rear face of the housing 12. Optionally, the light indicator system indicates whether any of the lights of any of the exterior lighting system of the vehicle are not functioning properly. The present invention would inform the driver if the vehicle's various lighting systems are working properly.

In use, the present invention would be used to provide additional signaling to other drivers so that they are aware of braking, impending turns, movement in reverse gear, and other vehicle operations, without adversely distracting the driver or passengers. Larger vehicles would incorporate additional auxiliary lighting locations to achieve the full intent of the invention.

In an alternate use, the invention could be used with toy vehicles that are modeled after normal size vehicles.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function, location and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A side view mirror with auxiliary lights for providing additional signaling to other drivers so they are aware of vehicle operations, the side view mirror with auxiliary lights comprising, in combination:
    a housing securable to a side of a vehicle, the housing having a mirror disposed within a rear face thereof;
    a spot light disposed within an upper portion of an outer edge of the housing, the spot light having a control mechanism positioned interiorly of the vehicle;
    a running light disposed within an upper portion of a front edge of the housing, the running light being in communication with a headlight system of the vehicle;
    a side light disposed within a lower portion of the outer edge of the housing, the side light being in communication with a turn indicator and a hazard indicator of the vehicle;
    a brake light disposed within a lower portion of a rear edge of the housing, the brake light being in communication with a brake actuator and a hazard indicator of the vehicle;
    a turning light disposed within a lower portion of the front edge of the housing, the turning light being in communication with the turn indicator of the vehicle;
    a reverse light disposed within a lower portion of the housing, the reverse light being in communication with a reverse light actuator of the vehicle; and
    a light indicator system disposed within the rear face of the housing, the light indicator system being in communication with an electrical system of the vehicle.

2. A side view mirror with auxiliary lights for providing additional signaling to other drivers so they are aware of vehicle operations, the side view mirror with auxiliary lights comprising, in combination:
    a housing securable to a side of a vehicle, the housing having a mirror disposed in a rear face thereof;
    a running light disposed in the housing, the running light being in communication with a headlight system of the vehicle;
    a turning light disposed in the housing, the turning light being in communication with a turn indicator of the vehicle; and
    wherein the running light is disposed in an upper portion of a front edge of the housing.

3. The side view mirror with auxiliary lights of claim 2, wherein the turning light is disposed in a lower portion of a front edge of the housing, the turning light being for providing light to a roadway when the turn indicator is activated, the turning light being for providing light to a roadway when the hazard indicator is activated.

4. The side view mirror with auxiliary lights of claim 2, further including a side light being in communication with a turn indicator and a hazard indicator of the vehicle, the side light being disposed in a lower portion of an outer edge of the housing.

5. The side view mirror with auxiliary lights of claim 2, further comprising a brake light being in communication with a brake actuator of the vehicle, the brake light being disposed in a lower portion of a rear edge of the housing.

6. The side view mirror with auxiliary lights of claim 2, further comprising a reverse light being in communication with a reverse light actuator of the vehicle, the reverse light being disposed in a lower portion of the housing.

7. The side view mirror with auxiliary lights of claim 2, further comprising a spot light disposed in an upper portion of an outer edge of the housing.

8. The side view mirror with auxiliary lights of claim 7, wherein the spot light has a control mechanism positioned interiorly of the vehicle.

9. The side view mirror with auxiliary lights of claim 2, further comprising a light indicator system being in communication with an electrical system of the vehicle, the light indicator system being disposed in the rear face of the housing.

10. The side view mirror with auxiliary lights of claim 9, wherein the light indicator system has a plurality of bulbs that indicate which of a vehicle's exterior lights is lit.

11. The side view mirror with auxiliary lights of claim 9, wherein the light indicator system has a plurality of bulbs that indicate whether any of a vehicle's exterior lights are not functioning properly.

12. A side view mirror with auxiliary lights for providing additional signaling to other drivers so they are aware of vehicle operations, the side view mirror with auxiliary lights comprising, in combination:
    a housing securable to a side of a vehicle, the housing having a mirror disposed in a rear face thereof;
    a running light disposed in the housing, the running light being in communication with a headlight system of the vehicle;
    turning light disposed in the housing, the turning light being in communication with a turn indicator of the vehicle; and
    wherein the turning light is disposed in a lower portion of a front edge of the housing, the turning light being for providing light to a roadway when the turn indicator is activated, the turning light being for providing light to a roadway when the hazard indicator is activated.

13. A side view mirror with auxiliary lights for providing additional signaling to other drivers so they are aware of vehicle operations, the side view mirror with auxiliary lights comprising, in combination:
    a housing securable to a side of a vehicle, the housing having a mirror disposed in a rear face thereof;
    a running light disposed in the housing, the running light being in communication with a headlight system of the vehicle;
    a turning light disposed in the housing, the turning light being in communication with a turn indicator of the vehicle;

a side light being in communication with a turn indicator and a hazard indicator of the vehicle; and wherein the side light is disposed in a lower portion of an outer edge of the housing.

14. A side view mirror with auxiliary lights for providing additional signaling to other drivers so they are aware of vehicle operations, the side view mirror with auxiliary lights comprising, in combination:

a housing securable to a side of a vehicle, the housing having a mirror disposed in a rear face thereof;

a running light disposed in the housing, the running light being in communication with a headlight system of the vehicle;

a turning light disposed in the housing, the turning light being in communication with a turn indicator of the vehicle;

further comprising a brake light being in communication with a brake actuator of the vehicle; and wherein the brake light is disposed in a lower portion of a rear edge of the housing.

15. A side view mirror with auxiliary lights for providing additional signaling to other drivers so they are aware of vehicle operations, the side view mirror with auxiliary lights comprising, in combination:

a housing securable to a side of a vehicle, the housing having a mirror disposed in a rear face thereof;

a running light disposed in the housing, the running light being in communication with a headlight system of the vehicle;

a turning light disposed in the housing, the turning light being in communication with a turn indicator of the vehicle;

a reverse light being in communication with a reverse light actuator of the vehicle; and wherein the reverse light is disposed in a lower portion of the housing.

16. A side view mirror with auxiliary lights for providing additional signaling to other drivers so they are aware of vehicle operations, the side view mirror with auxiliary lights comprising, in combination:

a housing securable to a side of a vehicle, the housing having a mirror disposed in a rear face thereof;

a running light disposed in the housing, the running light being in communication with a headlight system of the vehicle;

a turning light disposed in the housing, the turning light being in communication with a turn indicator of the vehicle; and a spot light, wherein the spot light is disposed in an upper portion of an outer edge of the housing.

17. A side view mirror with auxiliary lights for providing additional signaling to other drivers so they are aware of vehicle operations, the side view mirror with auxiliary lights comprising, in combination:

a housing securable to a side of a vehicle, the housing having a mirror disposed in a rear face thereof;

a running light disposed in the housing, the running light being in communication with a headlight system of the vehicle;

a turning light disposed in the housing, the turning light being in communication with a turn indicator of the vehicle;

a light indicator system being in communication with an electrical system of the vehicle; and wherein the light indicator system is disposed in the rear face of the housing.

* * * * *